J. SPEYER.
Improvement in India Ink Slabs.

No. 133,178.  Patented Nov. 19, 1872.

WITNESSES.
Fred Pfennig
Jacob Fischer

INVENTOR.
Julius Speyer

UNITED STATES PATENT OFFICE.

JULIUS SPEYER, OF TERRE HAUTE, INDIANA.

IMPROVEMENT IN INDIA-INK SLABS.

Specification forming part of Letters Patent No. 133,178, dated November 19, 1872.

*To all whom it may concern:*

Be it known that I, JULIUS SPEYER, of Terre Haute, in the county of Vigo and State of Indiana, have invented an Improved India-Ink Slab, of which the following is a specification:

My invention has for its object to furnish an improved slab, designed chiefly for use of draftsmen in grinding India-ink sticks, and for holding the liquid ink and preserving it from evaporation. It consists in forming a grinding-surface and an ink-well in the upper side of the slab or block, and a chamber in the under side of the same, in which the stick may be deposited when not in use.

Figure 1:
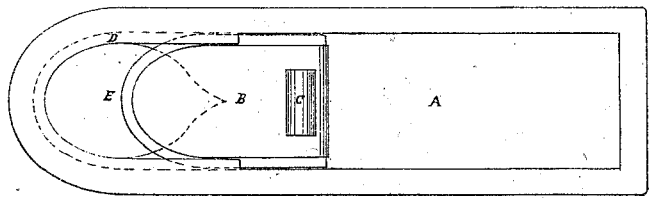
Figure 2:
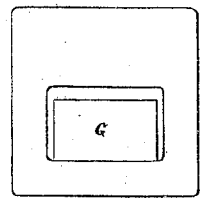
Figure 3:
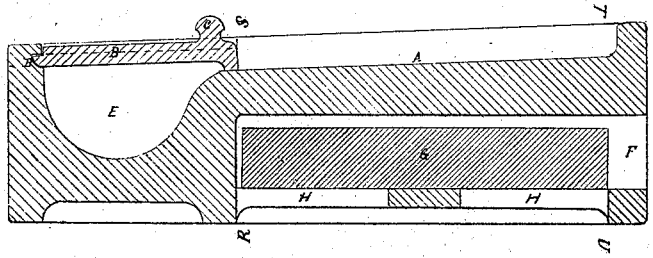
Figure 4:
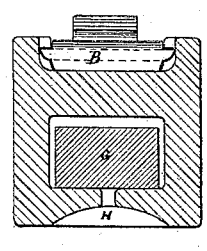
Figure 5:
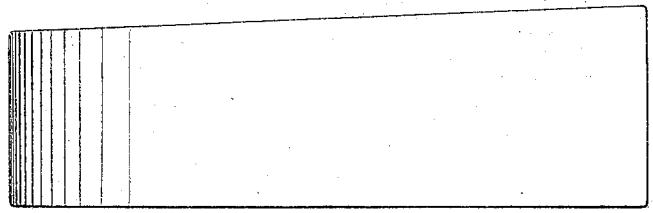
Figure 6:
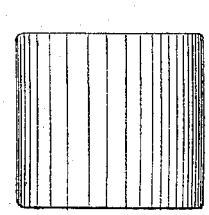
Figure 7:
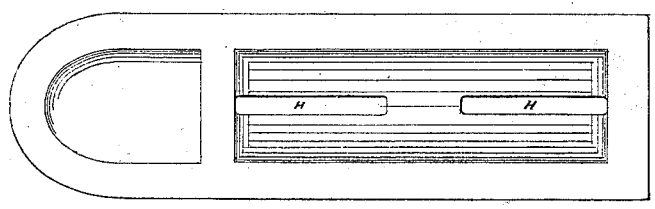
Figure 8:
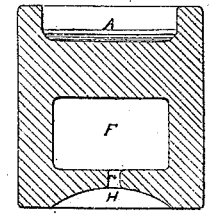

In the drawing, Figure 1 is a top plan view; Fig. 2, an end elevation; Fig. 3, a longitudinal vertical section; Fig. 4, a cross-section; Fig. 5, a side elevation; Fig. 6, an end elevation; Fig. 7, a bottom-plan view; and Fig. 8, another cross-section.

The slab or block is oblong and rectangular as to its general form. A grinding-surface, A, is formed on its upper side, and it inclines slightly toward the well or cavity E in the end thereof. A cover, B, provided with a knob or projection, C, which answers for a handle, is arranged to slide in grooves cut in the sides of the upwardly-projecting rim of the slab, whereby the liquid ink collected in the well E may be protected from exposure to the air and the consequent evaporation. In Fig. 1 the cover is shown partly open, and in Fig. 3 closed. Beneath the grinding-surface A I form a chamber, F, to receive an India-ink stick. The bottom of the slab is cut out, and slots H are formed therein, as shown. These slots communicate with the opening in the end of the slab, so as to allow a complete circulation of air around the stick, thus facilitating rapid drying of the same after having been used.

I propose making the slab of any suitable material, but preferably of clay, such as is utilized in producing what is known as China or porcelain ware.

Having thus described my invention, what I claim as new, and desire to secure by Letters Patent, is—

1. An India-ink slab provided with a grinding-surface, A, and a well, E, having a cover, B, arranged in relation to each other, as specified.

2. An India-ink slab provided with a suitable grinding-surface on its upper side and with the chamber F and slots H in its under side, substantially as specified.

JULIUS SPEYER.

Witnesses:
JACOB FISCHER,
FRED. PFENNIG.